United States Patent
Lu et al.

(10) Patent No.: US 9,261,629 B2
(45) Date of Patent: Feb. 16, 2016

(54) LENS MODULE AND MANUFACTURING METHOD THEREOF

(71) Applicant: HIMAX TECHNOLOGIES LIMITED, Tainan (TW)

(72) Inventors: Yin-Dong Lu, Tainan (TW); Han-Yi Kuo, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 12 days.

(21) Appl. No.: 14/331,943

(22) Filed: Jul. 15, 2014

(65) Prior Publication Data

US 2014/0327977 A1  Nov. 6, 2014

Related U.S. Application Data

(62) Division of application No. 13/744,255, filed on Jan. 17, 2013, now Pat. No. 8,817,394.

(51) Int. Cl.
*G02B 9/12* (2006.01)
*G02B 3/00* (2006.01)
*G02B 13/00* (2006.01)
*B29D 11/00* (2006.01)

(52) U.S. Cl.
CPC ............ *G02B 3/0062* (2013.01); *G02B 3/0012* (2013.01); *G02B 13/0085* (2013.01); *B29D 11/00307* (2013.01); *B29D 11/00403* (2013.01); *Y10T 156/10* (2015.01)

(58) Field of Classification Search
CPC .. G02B 3/0062; G02B 3/0068; G02B 3/0037; G02B 13/0085
See application file for complete search history.

(56) References Cited

U.S. PATENT DOCUMENTS 6,324,010 B1 * 11/2001 Bowen ............. B29D 11/00278
264/1.1
6,610,166 B1 * 8/2003 Harden ................ G02B 6/4206
156/242

(Continued)

FOREIGN PATENT DOCUMENTS

CN    1576931    2/2005
CN    1783953    6/2006

(Continued)

OTHER PUBLICATIONS

"Office Action of China Counterpart Application", issued on Oct. 10, 2015, p1-p5, in which the listed references were cited.

*Primary Examiner* — David N Spector
(74) *Attorney, Agent, or Firm* — J.C. Patents

(57) ABSTRACT

A method of manufacturing a lens module including following is provided. A first lens plate having a plurality of first lens sections, a second lens plate having a plurality of second lens sections and a third lens plate having a plurality of third lens sections are provided. The first lens sections of the first lens plate are separated to form a plurality of first lens units. The second and third lens plates are connected. A relative position between each of the first lens units and one of the second lens sections corresponding to the first lens unit is adjusted. Each of the first lens units and the second lens section corresponding to the first lens unit are connected. The second and third lens sections are separated to form a plurality of second lens units and a plurality of third lens units connected to the second lens units.

8 Claims, 10 Drawing Sheets

(56) References Cited

U.S. PATENT DOCUMENTS

| | | | | |
|---|---|---|---|---|
| 6,903,883 B2* | 6/2005 | Amanai | ............... | G02B 13/009 359/811 |
| 7,688,531 B1* | 3/2010 | Deng | ..................... | G02B 7/021 359/772 |
| 8,049,806 B2* | 11/2011 | Feldman | .................. | G02B 9/12 257/432 |
| 8,194,335 B2* | 6/2012 | Hsueh | ................ | G02B 13/0085 359/811 |
| 8,411,379 B2* | 4/2013 | Kathman | ......... | B29D 11/00298 359/741 |
| 2010/0038017 A1 | 2/2010 | Egawa | | |

FOREIGN PATENT DOCUMENTS

| | | |
|---|---|---|
| CN | 101251635 | 8/2008 |
| JP | 012242647 | 12/2012 |

* cited by examiner

LENS MODULE AND MANUFACTURING METHOD THEREOF

CROSS-REFERENCE TO RELATED APPLICATION

This application is a divisional application of U.S. application Ser. No. 13/744,255, filed on Jan. 17, 2013, now pending. The entirety of the above-mentioned patent application is hereby incorporated by reference herein and made a part of this specification.

TECHNICAL FIELD

The disclosure relates to an optical device and a manufacturing method of the optical device, and particularly relates to a lens module and a manufacturing method of the lens.

BACKGROUND

With the trends of microminiaturization and cost reduction of electronic products, the wafer level module (WLM) technology has drawn the attention. The WLM technology mainly applies the wafer level manufacturing technology to electronic products, so as to microminiaturize the electronic products. For example, applying the WLM technology to the manufacture of lenses renders the size of the lenses so manufactured significantly smaller than the size of the conventional lenses. Therefore, the manufactured lenses are further applicable to the camera modules in electronic devices such as laptops, tablets, and cell phones.

The conventional wafer level lens is manufactured by cutting two lens plates. Each of the lens plates has a plurality of lens portions. In the manufacture process of the wafer level lens, the lens portions of the two different lens plates need to be precisely aligned to ensure the optical quality of the wafer level lens. Recently, due to the demands on the image quality of the consumers, the wafer level lens manufactured by cutting two lens plates cannot satisfy the consumers' demands on imaging quality. Therefore, the manufacturers need to align three lens plates and cut them for obtaining the wafer level lens with a preferable quality. However, aligning the lens portions of three different lens plates is a challenge in the manufacture process.

SUMMARY

The disclosure provides a manufacture method of a lens module. The lens module manufactured with the manufacture method has a high optical quality.

The disclosure provides a lens module with a high optical quality.

An embodiment of the disclosure provides a manufacture method of a lens module, including the following. A first lens plate having a plurality of first lens sections, a second lens plate having a plurality of second lens sections, and a third lens plate having a plurality of third lens sections are provided. The first lens sections of the first lens plate are separated to form a plurality of first lens units. The second lens plate and the third lens plate are connected, and the second lens sections correspond to the third lens sections. A relative position between each of the first lens units and one of the second lens sections corresponding to the first lens unit is adjusted. Each of the first lens units and the second lens section corresponding to the first lens unit are connected. The second lens sections and the third lens sections are separated to form the second lens units and the third lens units connected to the second lens units. Each of the first lens units, the second lens unit connected to the first lens unit, and the third lens unit connected to the first lens unit form a lens module.

Another embodiment of the disclosure provides a manufacture method of a lens module, including the following. A first lens plate having a plurality of first lens sections, a second lens plate having a plurality of second lens sections, and a third lens plate having a plurality of third lens sections are provided. The first lens sections of the first lens plate are separated to form a plurality of first lens units. The second lens plate are connected with the third lens plate, and the second lens sections correspond to the third lens sections. The second lens sections and the third lens sections are separated to form the second lens units and the third lens units connected to the second lens units. The second lens units and the third lens units form a plurality of compound lens units. A relative position between each of the first lens units and one of the compound lens units corresponding to the first lens unit is adjusted. Each of the first lens units and the compound lens unit corresponding to the first lens unit are connected to form the lens module.

An embodiment of the disclosure provides a lens module. The lens module includes a first lens unit, a second lens unit, and a third lens unit. The second lens unit is disposed between the first lens unit and the third lens unit, and has a connecting surface connected with the first lens unit. The first lens unit has a first cutting surface. The second lens unit has a second cutting surface. The third lens unit has a third cutting surface. The first cutting surface, the second cutting surface, and the third cutting surface are not aligned along a normal direction of the connecting surface. There is an offset of the first cutting surface from the second cutting surface and the third cutting surface.

In an embodiment of the disclosure, the second cutting surface and the third cutting surface are aligned.

In an embodiment of the disclosure, the first lens unit exposes a portion of the connecting surface. The portion of the connecting surface exposed by the first lens unit is disposed between the first cutting surface and the second cutting surface.

In an embodiment of the disclosure, the lens module further includes a bonding material. The bonding material is disposed between the first and second lens units and covering the portion of the connecting surface exposed by the first lens unit.

In an embodiment of the disclosure, the first lens unit includes a first light-transmitting substrate and at least one first lens film disposed on the first light-transmitting substrate. The first lens film has a first lens portion. The second lens unit includes a second light-transmitting substrate and at least one second lens film disposed on the second light-transmitting substrate. The second lens film has a second lens portion. The third lens unit includes a third light-transmitting substrate and at least one third lens film disposed on the third light-transmitting substrate. The third lens film has a third lens portion.

In an embodiment of the disclosure, an influence of a standard offset of the first lens unit from the second lens unit and the third lens unit on an optical property of the lens module is greater than an influence of the standard offset of the third lens unit from the first lens unit and the second lens unit on the optical property of the lens module. The influence of the standard offset of the first lens unit from the second lens unit and the third lens unit on the optical property of the lens module is greater than an influence of the standard offset of the second unit from the first lens unit and the third lens unit on the optical property of the lens module.

In an embodiment of the disclosure, the standard offset is a standard offset distance between an optical axis of one of the first, second, and third lens units and optical axes of other two of the first, second, and third lens units.

In an embodiment of the disclosure, the optical property of the lens module is a modulation transfer function of the lens module.

In an embodiment of the disclosure, adjusting the relative position between each of the first lens units and the second lens section corresponding to the first lens unit is to substantially align an optical axis of each of the first lens units with an optical axis of the second lens section corresponding to the first lens unit.

In an embodiment of the disclosure, the first lens plate includes a first light-transmitting substrate and at least one first lens film disposed on the first light-transmitting substrate. The first lens film has a plurality of first lens portions. Each of the first lens portions and a part of the first light-transmitting substrate overlapped with the first lens portion form the first lens section. The second lens plate includes a second light-transmitting substrate and at least one second lens film disposed on the second light-transmitting substrate. The second lens film has a plurality of second lens portions. Each of the second lens portions and a part of the second light-transmitting substrate overlapped with the second lens portion form the second lens section. The third lens plate includes a third light-transmitting substrate and at least one third lens film disposed on the third light-transmitting substrate. The third lens film has a plurality of third lens portions. Each of the third lens portions and a part of the third light-transmitting substrate overlapped with the third lens portions form the third lens section.

In view of the foregoing, in the manufacturing method of manufacturing lens module according to an embodiment of the disclosure, the most sensitive lens units in the lens modules are respectively aligned with another lens sections or compound lens units. Therefore, the lens module manufactured with the method has a high optical quality.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The First Embodiment

Manufacturing Method of Lens Module

Figure 1:
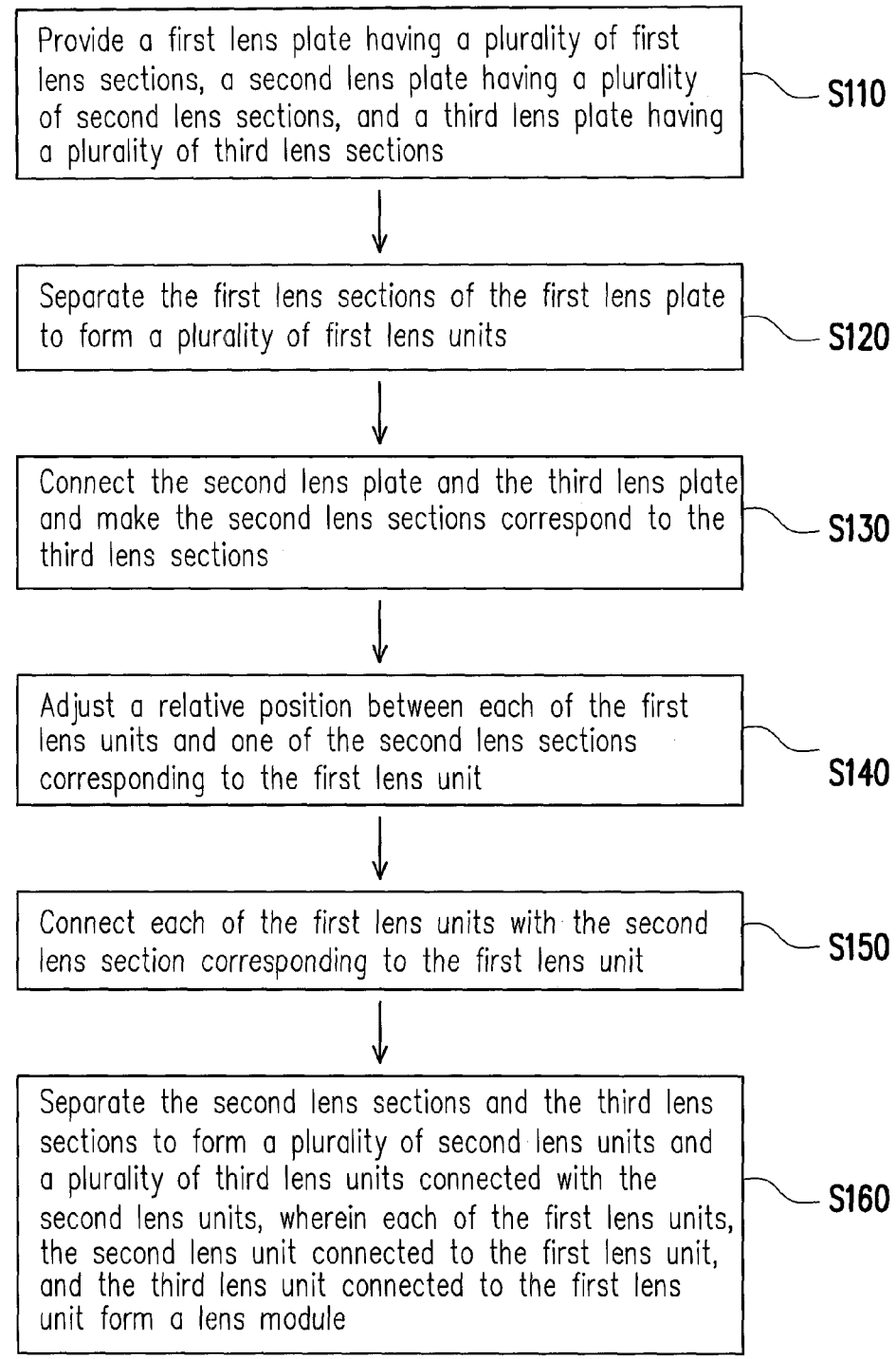
FIG. 1 is a flowchart illustrating a manufacturing method of a lens module according to an embodiment of the disclosure.

FIG. 1 is a flowchart illustrating a manufacturing method of a lens module according to an embodiment of the disclosure.

Referring to FIG. 1, a manufacturing method of a lens module in this embodiment includes the following. A first lens plate having a plurality of first lens sections, a second lens plate having a plurality of second lens sections, and a third lens plate having a plurality of third lens sections are provided (Step S110). The first lens sections of the first lens plate are separated to form a plurality of first lens units (Step S120). The second lens plate and the third lens plate are connected. In addition, the second lens sections are correspond to the third lens sections (Step S130). A relative position between each of the first lens units and one of the second lens sections corresponding to the first lens unit is adjusted (Step S140). Each of the first lens units and the second lens section corresponding to the first lens unit are connected (Step S150). The second lens sections and the third lens sections are separated to form a plurality of second lens units and a plurality of third lens units connected with the second lens units, wherein each of the first lens units, the second lens unit connected to the first lens unit, and the third lens unit connected to the first lens unit form a lens module (Step S160).

It should be noted that in this embodiment, Steps S110, S120, S130, S140, S150, and S160 are proceeded in sequence. However, the disclosure is not limited thereto. A sequence of Steps S110, S120, S130, S140, S150, and S160 may be adaptively adjusted. For example, in other embodiments, a sequence of Steps S110, S120, S140, S150, S130, and S160, a sequence of Steps S110, S130, S120, S140, S150, and S160, or a sequence of Steps S110, S130, S120, S140, S150, and S160 may be proceeded.

Figure 2A:
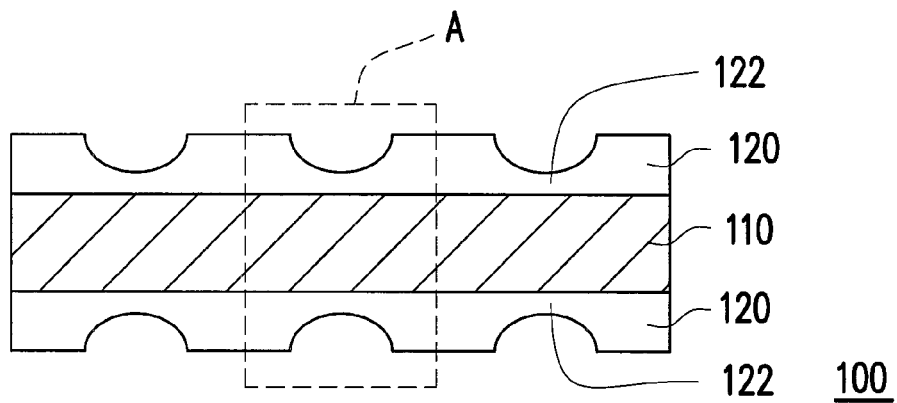
FIGS. 2A to 2G are cross-sectional schematic views illustrating a manufacturing method of a lens module according to an embodiment of the disclosure.
Figure 2B:
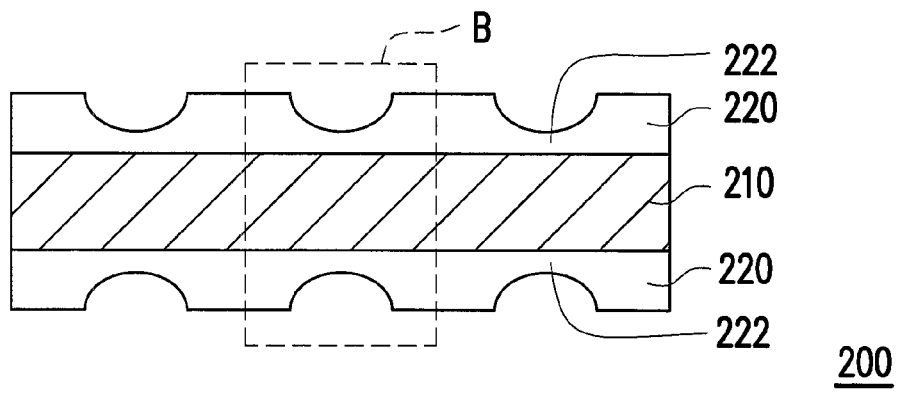
Figure 2C:
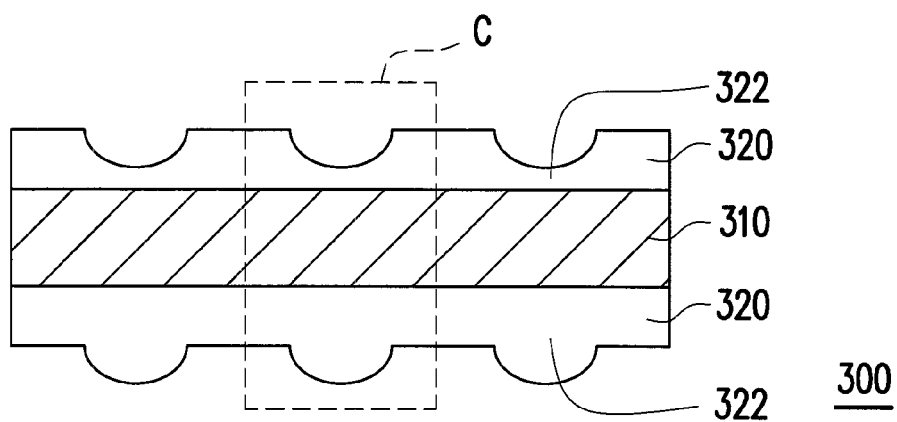

The manufacturing method of the lens module according to an embodiment of the disclosure is described in detail below with reference to FIGS. 2A to 2G. FIGS. 2A to 2G are cross-sectional schematic views illustrating a manufacturing method of a lens module according to an embodiment of the disclosure. Referring to FIGS. 2A, 2B, and 2C, a first lens plate 100 having a plurality of first lens sections A, a second lens plate 200 having a plurality of second lens sections B, and a third lens plate 300 having a plurality of third lens sections C are provided. The first lens sections A are connected to each other. The second lens sections B are connected to each other. The third lens sections C are connected to each other.

The first lens plate 100 of this embodiment includes a first light-transmitting substrate 110 and at least one first lens film 120 disposed on the first light-transmitting substrate 110. The first lens film 120 has a plurality of first lens portions 122. Each of the first lens portions 122 and a part of the first light-transmitting substrate 110 overlapped with the first lens portion 122 form the first lens section A. The first lens portion 122 may be a concave lens, for example, but the disclosure is not limited thereto. The first lens portion 122 may also be a convex lens or a lens in other appropriate forms.

The second lens plate 200 of this embodiment includes a second light-transmitting substrate 210 and at least one second lens film 220 disposed on the second light-transmitting substrate 210. The second lens film 220 has a plurality of second lens portions 222. Each of the second lens portions 222 and a part of the second light-transmitting substrate 210 overlapped with the second lens portion 222 form the second lens section B. In this embodiment, the second lens portion 220 may be a concave lens, for example, but the disclosure is not limited thereto. The second lens portion 220 may also be a convex lens or a lens in other appropriate forms.

The third lens plate 300 of this embodiment includes a third light-transmitting substrate 310 and at least one third lens film 320 disposed on the third light-transmitting substrate 310. The third lens film 320 has a plurality of third lens portions 322. Each of the third lens portions 322 and a part of the third light-transmitting substrate 310 overlapped with the third lens portions 322 form the third lens section C. The third lens portion 322 may be a concave lens, a convex lens, or a lens in other appropriate forms. The first light-transmitting substrate 110, the second light-transmitting substrate 210, and the third light-transmitting substrate 310 may be glass substrates, such as a glass wafer. However, the disclosure is not limited thereto. In other embodiments, the first light-transmitting substrate 110, the second light-transmitting substrate 210, and the third light-transmitting substrate 310 may also be light-transmitting substrates of other materials.

Figure 2D:
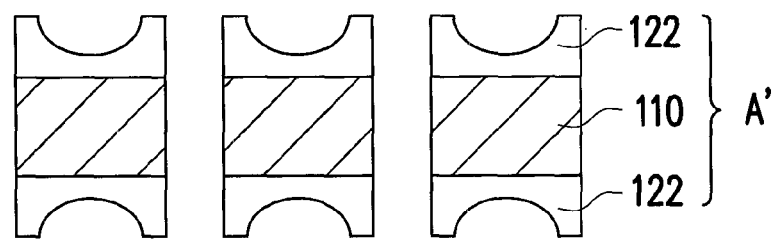

Referring to FIGS. 2A and 2D, the first lens sections A of the first lens plate 100 are then separated to form a plurality of first lens units A'. In this embodiment, a cutting tool may be used to cut the first lens plate 100 to form the first lens units A' separated from each other. However, the disclosure does not limit on a method of separating the first lens sections A. In other embodiments, the first lens sections A may be separated by laser cutting or other appropriate ways to obtain the first lens units A'.

Figure 2E:
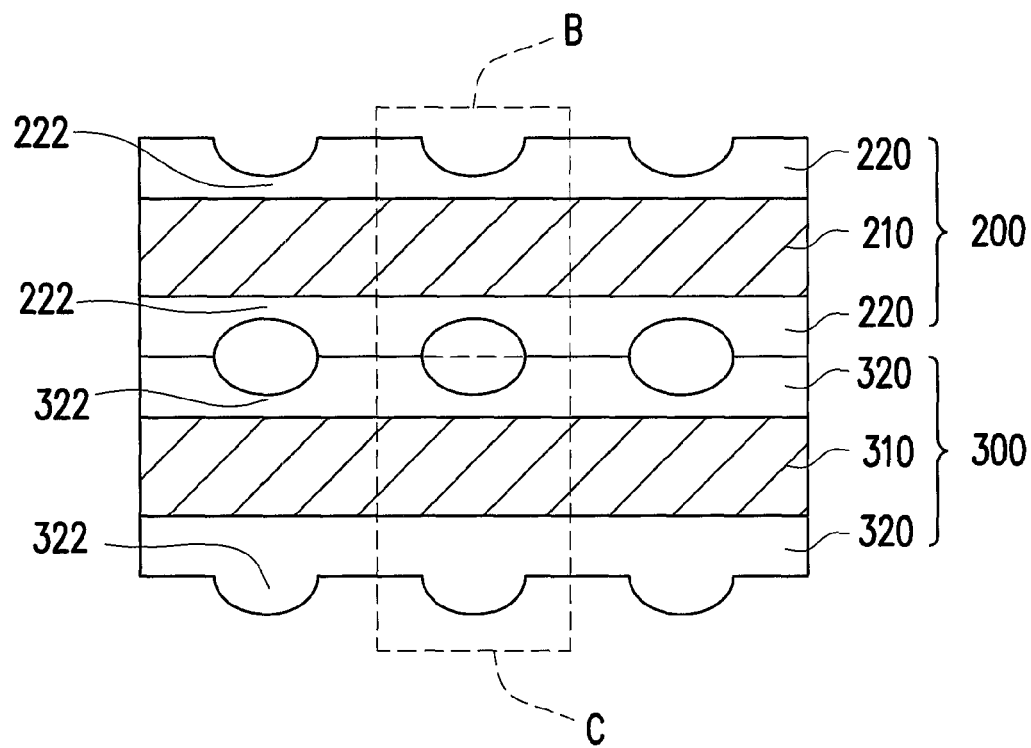

Referring to FIG. 2E, the second lens plate 200 and the third lens plate 300 are then connected, and the second lens sections B are correspond to the third lens sections C. More specifically, in this embodiment, a bonding material (not shown) may be formed on the third lens plate 300. Then, alignment marks on the second lens plate 200 and the third lens plate 300 are used to align the second lens portions 222 of the second lens plate 200 with the third lens portions 322 of the third lens plate 300. The boding material is then solidified, such that a relative position between the second lens plate 200 and the third lens plate 300 are fixed.

Figure 2F:
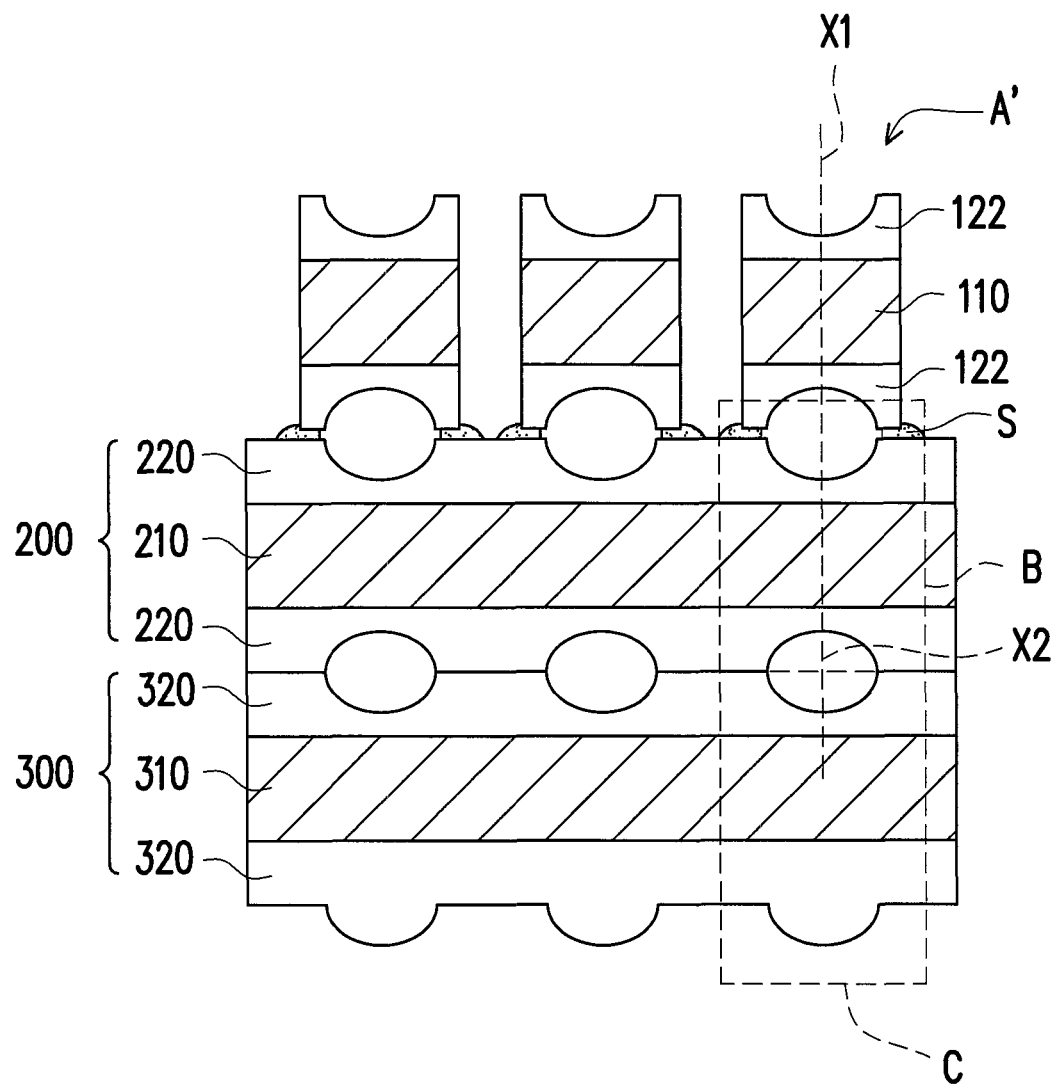
Figure 3:
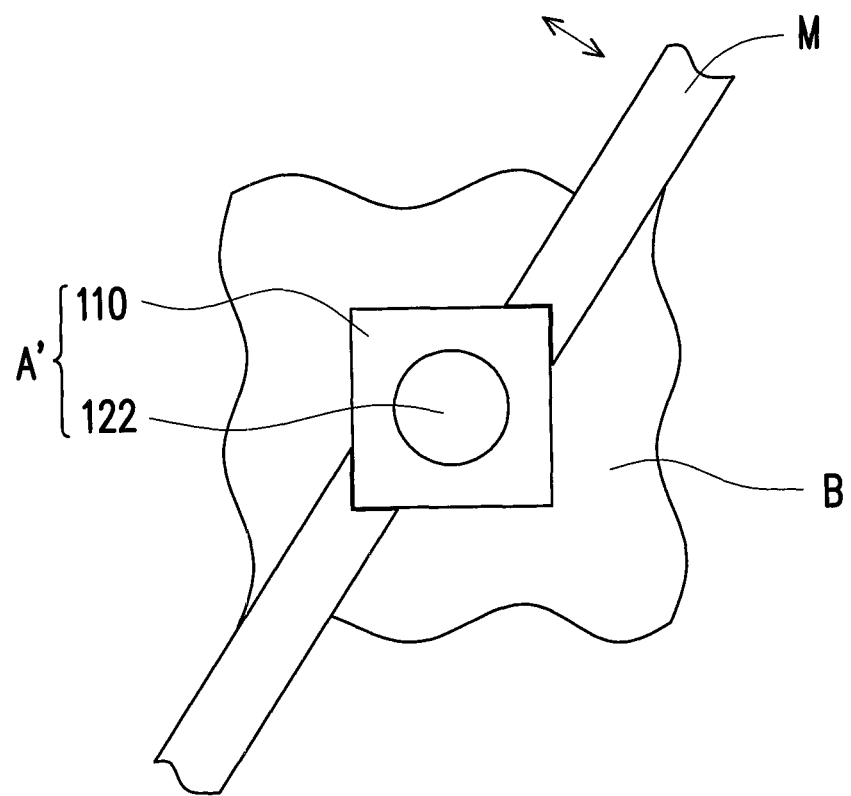
FIG. 3 is a schematic view illustrating that a relative position between a first lens unit and one corresponding of the second lens sections is adjusted.

Referring to FIG. 2F, a relative position between each of the first lens units A' and one of the second lens sections B corresponding to the first lens unit A' is adjusted. In this embodiment, adjusting the relative position between each of the first lens units A' and the second lens section B corresponding to the first lens unit A' may be to substantially align an optical axis X1 of the first lens units A' with an optical axis X2 of the second lens section B corresponding to the first lens unit A'. FIG. 3 is a schematic view illustrating that a relative position between a first lens unit and one corresponding of the second lens sections is adjusted. Referring to FIG. 3, in this embodiment, an adjustment machine M may be used to hold opposite corners of the first lens unit A' to move the first lens unit A', such that the optical axis of the first lens unit A' is as aligned as possible with the optical axis of the second lens section B corresponding to the first lens unit A'. However, the disclosure is not limited thereto. In other embodiments, the relative position between the first lens unit A' and the second lens section B' corresponding to the first lens unit A' may be adjusted in other ways.

Then, each of the first lens units A' and the second lens section B corresponding to the first lens unit A' are connected. Specifically, in this embodiment, a bonding material S may be formed on the first lens unit A' or the second lens section B before the relative position between the first lens unit A' and the second lens section B is adjusted. The bonding material S is then used to preliminarily adhere the first lens unit A' onto the second lens section B corresponding to the first lens unit A'. Then, after the relative position of the first lens unit A' and the second lens section B corresponding to the first lens unit A' is adjusted, the bonding material S is then solidified, such that the first lens unit A' is fixed on the second lens section B corresponding to the first lens unit A' at a correct position.

Figure 2G:
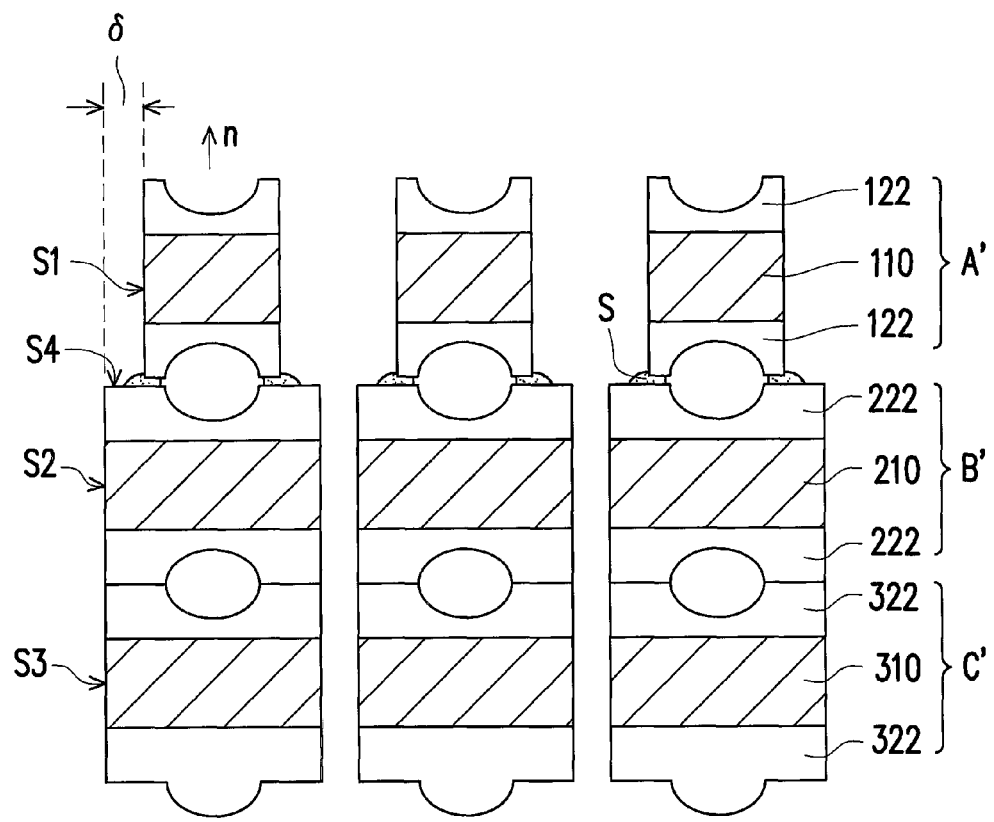

Referring to FIGS. 2F and 2G, the second lens sections B of the second lens plate 200 and the third lens sections C of the third lens plate 300 are then separated to form a plurality of second lens units B' and a plurality of third lens units C' connected to the second lens units B'. Each of the first lens units A', the second lens unit B' connected to the each of the first lens units A', and the third lens unit C' form a lens module 1000. In other words, in this embodiment, the second lens section B and the third lens section C corresponding to the second lens section B are separated together and form the lens module 1000 with the first lens unit A' that is already connected to the second lens section B.

It should be noted that an influence of a standard offset of the first lens unit A' from the second lens unit B' and the third lens unit C' on an optical property of the lens module 1000 is greater than an influence of the standard offset of the third lens unit C' from the first lens unit A' and the second lens unit B' on the optical property of the lens module 1000. In addition, the influence of the standard offset of the first lens unit A' from the second lens unit B' and the third lens unit C' on the optical property of the lens module 1000 is greater than an influence of the standard offset of the second unit B' from the first lens unit A' and the third lens unit C' on the optical property of the lens module 1000.

For example, given that an optical axis of the second lens unit B' is aligned with an optical axis of the third lens unit C', and there is a standard offset distance (0.005 µm, for example) of the optical axis of the first lens unit A' from the optical axes of the second lens unit B' and the third lens unit C', a modulation transfer function (MTF) of the lens module 1000 has a first variation. Given that the optical axis of the first lens unit A' is aligned with the optical axis of the third lens unit C', and there is the standard offset distance (0.005 µm, for example) of the optical axis of the second lens unit B' from the optical axes of the first lens unit A' and the third lens unit C', the modulation transfer function (MTF) of the lens module 1000 has a second variation. Given that the optical axis of the first lens unit A' is aligned with the optical axis of the second lens unit B', and there is the standard offset distance (0.005 µm, for example) of the optical axis of the third lens unit C' from the optical axes of the first lens unit A' and the second lens unit B', the modulation transfer function (MTF) of the lens module 1000 has a third variation. The first variation is greater than the second and third variations.

In other words, deviation of the first lens unit A' has the greatest influence on an optical quality on the lens module 1000 if the first lens unit A' is deviated other lens units in the lens module. Therefore, in this embodiment, the most sensitive lens units A' are aligned with the second lens sections B corresponding to the most sensitive lens units A' in a one-by-one manner to complete the lens modules 1000. The lens modules 1000 manufactured in this method have high optical qualities.

Lens Module

Referring to FIG. 2G, the lens module 1000 includes the first lens unit A', the second lens unit B', and the third lens unit C'. The lens second unit B' is disposed between the first lens unit A' and the third lens unit C'. The first lens unit A' includes the first light-transmitting substrate 110 and at least one first lens portion 122. The second lens unit B' includes the second light-transmitting substrate 210 and at least one second lens portion 222. The third lens unit C' includes the third light-transmitting substrate 310 and at least one third lens portion 322. The first lens portion 122, the second lens portion 222, and the third lens portion 322 are not limited to be a convex lens or a concave lens. The manufacturer may design forms of the first lens portion 122, the second lens portion 222, and the third lens portion 322 based on practical needs.

The second lens unit B' has a connecting surface S4 connected with the first lens unit A'. The first lens unit A' has a first cutting surface S1. The second lens unit B' has a second cutting surface S2. The third lens unit C' has a third cutting surface S3. It should be noted the first cutting surface S1, the second cutting surface S2, and the third cutting surface S3 are not aligned along a normal direction n of the connecting surface S4, and there is an offset δ of the first cutting surface S1 from the second cutting surface S2 and the third cutting surface S3, wherein the offset δ is not equal to zero. In this embodiment, the second cutting surface S2 and the third cutting surface S3 are aligned. The offset δ may be a distance between the first cutting surface S1 and the second cutting surface S2. However, the disclosure is not limited thereto. In other embodiments, the offset δ may be an included angle between the first cutting surface S1 and the second cutting surface S2.

Furthermore, the first lens unit A' of this embodiment exposes a portion of the connecting surface S4. The portion of the connecting surface S4 exposed by the first lens unit A' is disposed between the first cutting surface S1 and the second cutting surface S2. The lens module 1000 in this embodiment further includes the bonding material S disposed between the first lens unit A' and the second lens unit B'. The bonding material S covers the portion of the connecting surface S4 exposed by the first lens unit A'. The lens module 1000 is manufactured with the method described above. The lens module 1000 has a high optical quality.

The Second Embodiment

Manufacturing Method of Lens Module

A manufacturing method of a lens module in this embodiment is similar to the manufacturing method of the lens module in the first embodiment, so identical components are referred with the same numbers. Only the differences between the methods are described, and the similarities will not be reiterated hereinafter.

Figure 4:
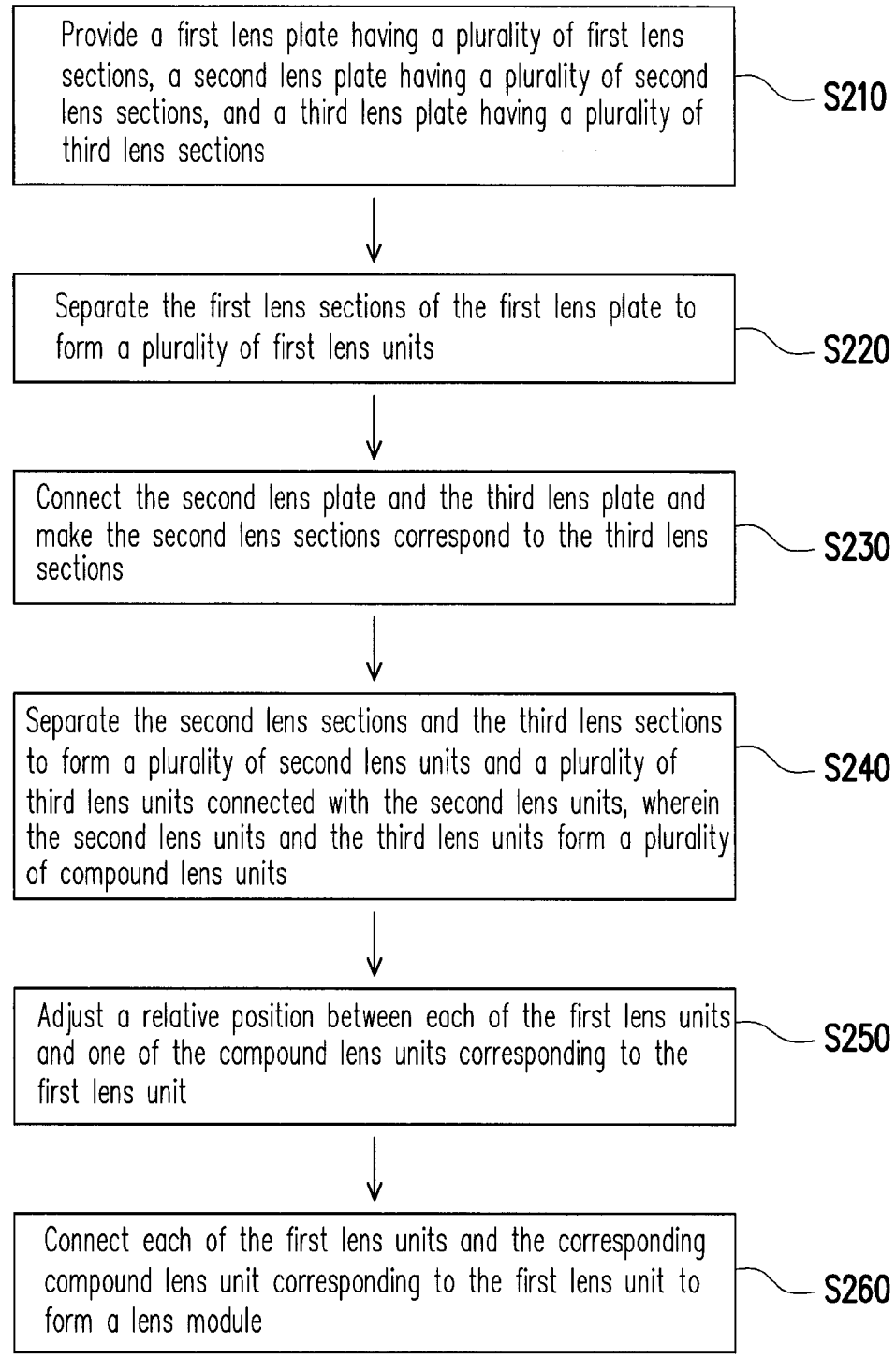
FIG. 4 is a flowchart illustrating a manufacturing method of a lens module according to an embodiment of the disclosure.

FIG. 4 is a flowchart illustrating a manufacturing method of a lens module according to an embodiment of the disclosure. Referring to FIG. 4, a manufacturing method of a lens module in this embodiment includes the following. A first lens plate having a plurality of first lens sections, a second lens plate having a plurality of second lens sections, and a third lens plate having a plurality of third lens sections are provided (Step S210). The first lens sections of the first lens plate are separated to form a plurality of first lens units (Step S220). The second lens plate and the third lens plate are connected. In addition, the second lens sections are correspond to the third lens sections (Step S230). The second lens sections and the third lens sections are separated to form a plurality of second lens units and a plurality of third lens units connected with the second lens units, wherein the second lens units and the third lens units form a plurality of compound lens units (Step S240). A relative position between each of the first lens units and one of the compound lens units corresponding to the first lens unit is adjusted (Step S250). Each of the first lens units and the compound lens unit corresponding to the first lens unit are connected to form a lens module (Step S260).

It should be noted that in this embodiment, Steps S210, S220, S230, S240, S250, and S260 are proceeded in sequence. However, the disclosure is not limited thereto. A sequence of Steps S210, S220, S230, S240, S250, and S260 may be adaptively adjusted. For example, in other embodiments, a sequence of Steps S210, S230, S240, S220, S250, and S260, or a sequence of Steps S210, S230, S220, S240, S250, and S260 may be proceeded.

Figure 5A:
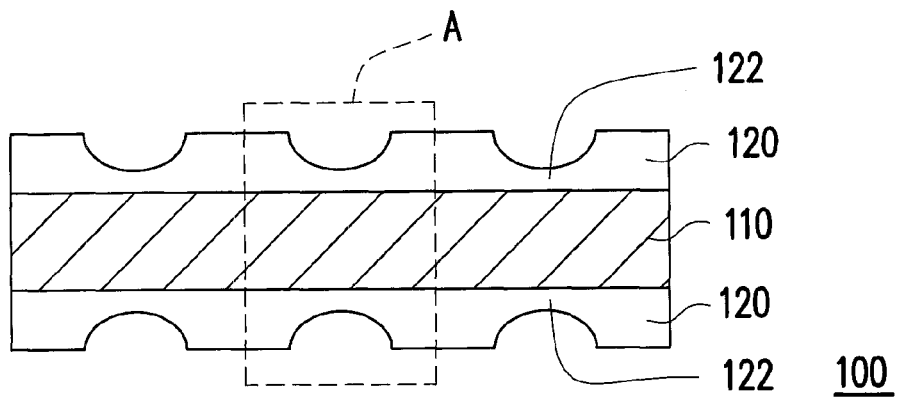
FIGS. 5A to 5G are cross-sectional schematic views illustrating a manufacturing method of a lens module according to an embodiment of the disclosure.
Figure 5B:
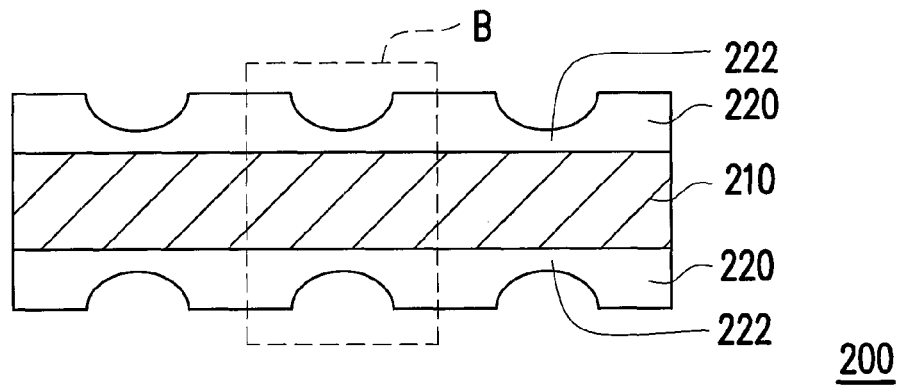
Figure 5C:
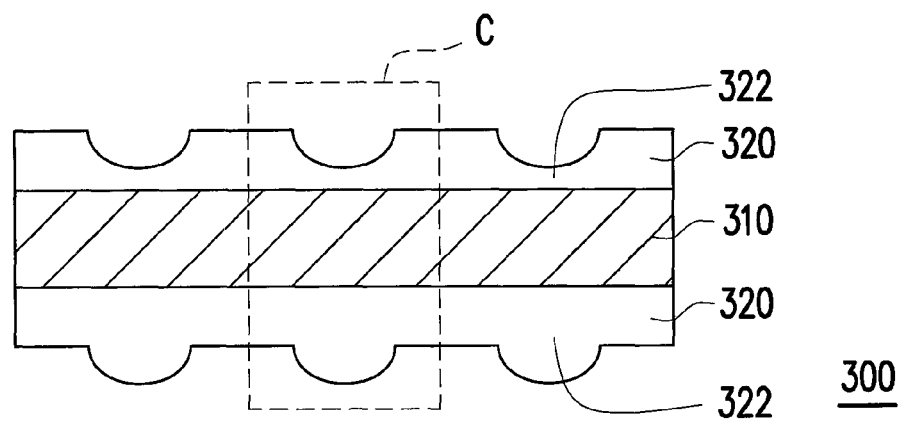

The manufacturing method of the lens module according to an embodiment of the disclosure is described in detail below with reference to FIGS. 5A to 5G. FIGS. 5A to 5G are cross-sectional schematic views illustrating a manufacturing method of a lens module according to an embodiment of the disclosure. Referring to FIGS. 5A, 5B, and 5C, the first lens plate 100 having the first lens sections A, the second lens plate 200 having the second lens sections B, and the third lens plate 300 having the third lens sections C are provided.

Figure 5D:
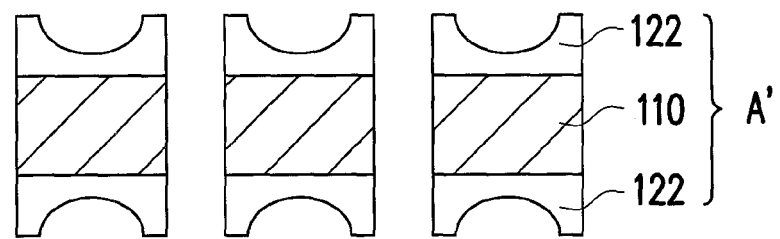
Figure 5E:
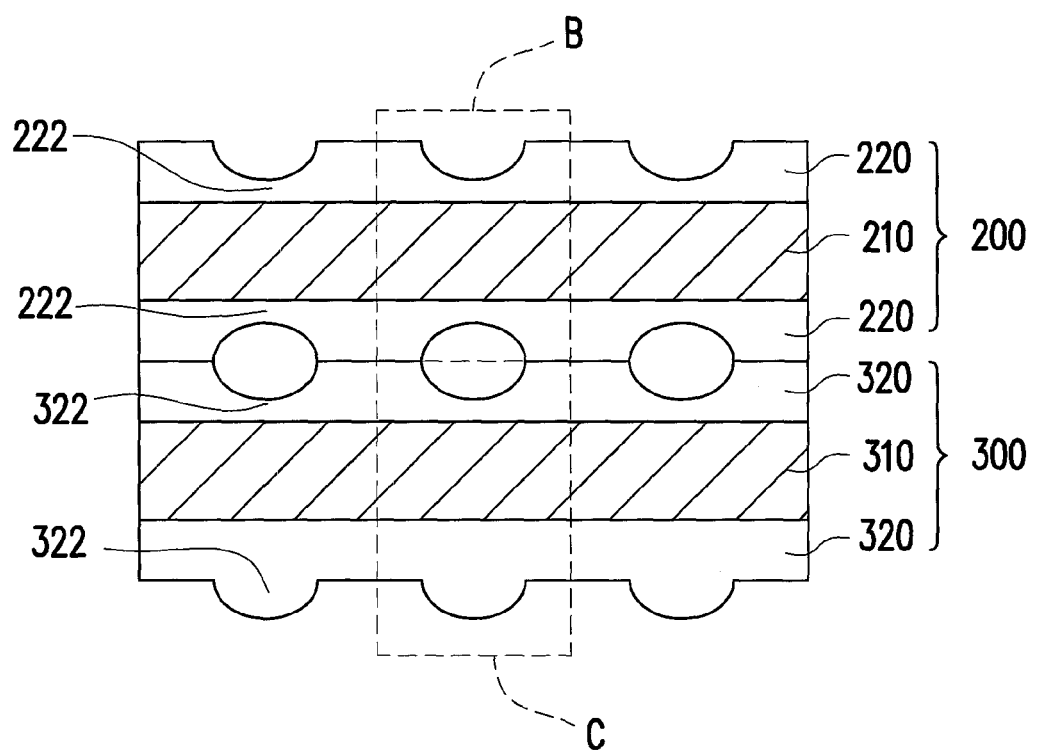
Figure 5F:
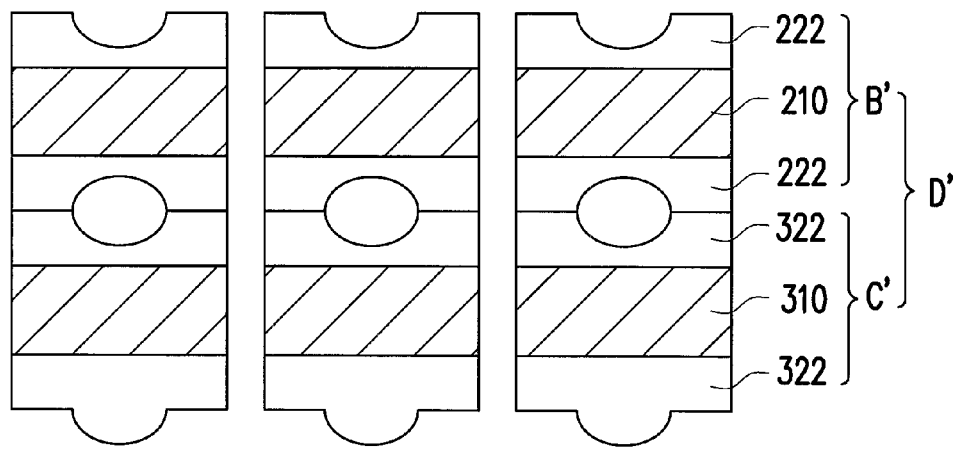

Referring to FIGS. 5A and 5D, the first lens sections A of the first lens plate 100 are separated to form the first lens units A'. Referring to FIG. 5E, the second lens plate 200 and the third lens plate 300 are then connected, and the second lens sections B are correspond to the third lens sections C. Referring to FIGS. 5E and 5F, the second lens sections B and the third lens sections C are separated to form the second lens units B' and the third lens units C' connected to the second lens units B'. The second lens units B' and the third lens units C' form a plurality of compound lens units D'. In this embodiment, each of the second lens units B and one of the third lens sections C corresponding to the second lens unit B are separated together to form the compound lens unit D'.

Figure 5G:
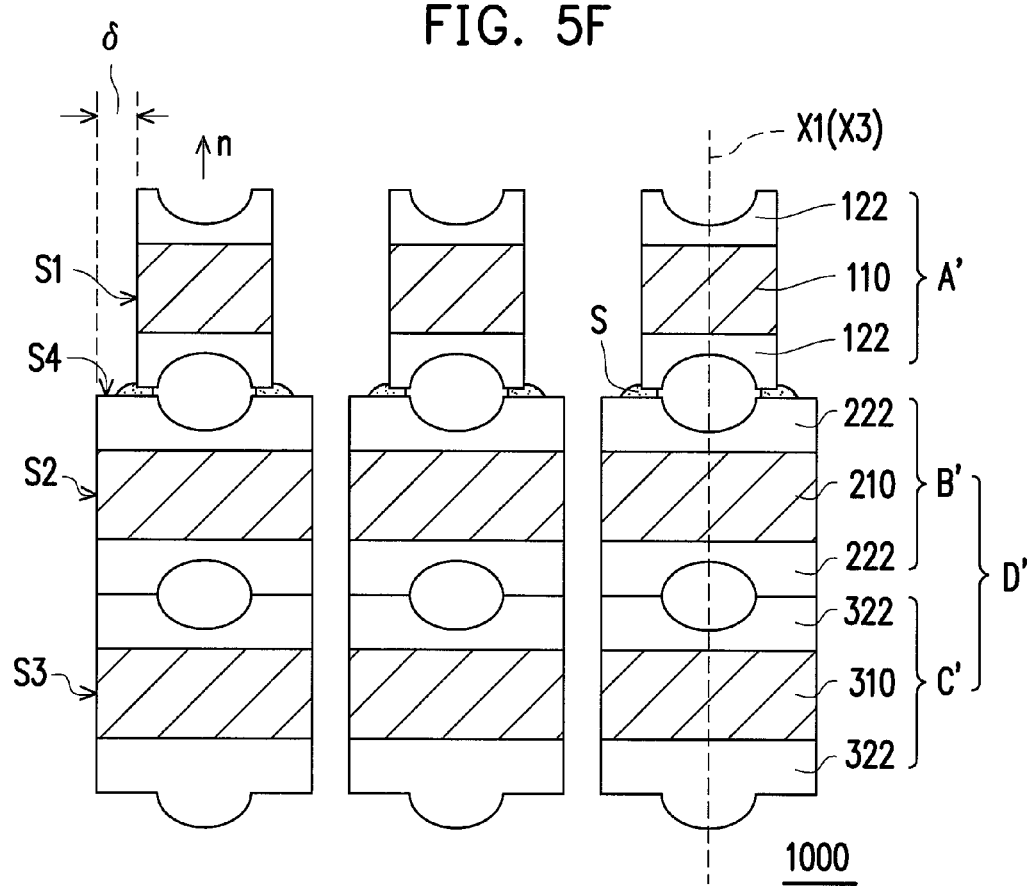

Referring to FIG. 5G, a relative position between each of the first lens units A' and one of the compound lens units D' corresponding to the first lens unit A' is adjusted. In this embodiment, adjusting the relative position between each of the first lens units A' and one of the compound lens units D' corresponding to the first lens unit A' may be to substantially align the optical axis X1 of each of the first lens units A' with an optical axis X3 of the corresponding compound lens unit D'. Similar to the first embodiment, in this embodiment, an adjustment machine may be used to hold the opposite corners of the first lens unit A' to move the first lens unit A', such that the optical axis of the first lens unit A' is as aligned as possible with the optical axis X3 of the compound lens unit D'. Then, the first lens units A' and the corresponding compound lens units D' are connected to form the lens modules 1000.

Similar to the first embodiment, each of the most sensitive lens units A' is aligned and connected with the corresponding compound lens D' in a one-by-one manner. Therefore, the lens module 1000 manufactured with this method of manufacturing the lens module in this embodiment may also have a high optical quality.

In view of the foregoing, in the manufacturing method of manufacturing lens module according to an embodiment of the disclosure, the most sensitive lens units in the lens modules are respectively aligned with another lens sections or compound lens units. Therefore, the lens module manufactured with the manufacturing method of lens module according to an embodiment of the disclosure has a high optical quality.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A lens module, comprising:
  a first lens unit;
  a second lens unit; and
  a third lens unit, wherein the second lens unit is disposed between the first and third lens units and has a connecting surface connected with the first lens unit, the first lens unit has a first cutting surface, the second lens unit has a second cutting surface, and the third lens unit has a third cutting surface, wherein the first, second and third cutting surfaces are not aligned along a normal direction of the connecting surface, and there is an offset of the first cutting surface from the second cutting surface and the third cutting surface.

2. The lens module as claimed in claim 1, wherein the second and third cutting surfaces are aligned.

3. The lens module as claimed in claim 1, wherein the first lens unit comprises a first light-transmitting substrate and a first lens film disposed on the first light-transmitting substrate and having a first lens portion, the second lens unit comprises a second light-transmitting substrate and a second lens film disposed on the light-transmitting substrate and having a second lens portion, and the third lens unit comprises a third light-transmitting substrate and a third lens film disposed on the light-transmitting substrate and having a third lens portion.

4. The lens module as claimed in claim 1, wherein the first lens unit exposes a portion of the connecting surface, and the portion of the connecting surface exposed by the first lens unit is disposed between the first cutting surface and the second cutting surface.

5. The lens module as claimed in claim 4, further comprising: a bonding material, disposed between the first and second lens units and covering the portion of the connecting surface exposed by the first lens unit.

6. The lens module as claimed in claim 1, wherein an influence of a standard offset of the first lens unit from the second lens unit and the third lens unit on an optical property of the lens module is greater than an influence of the standard offset of the third lens unit from the first lens unit and the second lens unit on the optical property of the lens module, and the influence of the standard offset of the first lens unit from the second lens unit and the third lens unit on the optical property of the lens module is greater than an influence of the standard offset of the second lens unit from the first lens unit and the third lens unit on the optical property of the lens module.

7. The lens module as claimed in claim 6, wherein the standard offset is a standard offset distance between an optical axis of one of the first, second, and third lens units and optical axes of other two of the first, second, and third lens units.

8. The lens module claimed in claim 6, wherein the optical property of the lens module is a modulation transfer function of the lens module.

* * * * *